United States Patent [19]

Fujimoto et al.

[11] Patent Number: 5,347,612
[45] Date of Patent: Sep. 13, 1994

[54] VOICE RECOGNITION SYSTEM AND METHOD INVOLVING REGISTERED VOICE PATTERNS FORMED FROM SUPERPOSITION OF A PLURALITY OF OTHER VOICE PATTERNS

[75] Inventors: Junichiroh Fujimoto, Yokohama; Seigo Yasuda, Yokosuka; Tomofumi Nakatani, Yokohama, all of Japan

[73] Assignee: Ricoh Company, Ltd., Tokyo, Japan

[21] Appl. No.: 552,842

[22] Filed: Jul. 16, 1990

Related U.S. Application Data

[63] Continuation of Ser. No. 184,446, Mar. 29, 1988, abandoned.

[30] Foreign Application Priority Data

Jul. 30, 1986 [JP] Japan .................. 61-179394
Mar. 18, 1987 [JP] Japan .................. 62-63406

[51] Int. Cl.$^5$ ............................... G10L 7/08
[52] U.S. Cl. .................. 395/2.52; 395/2.63
[58] Field of Search .................. 381/41–50; 364/513.5, 728.03; 395/2.52, 2.63

[56] References Cited

U.S. PATENT DOCUMENTS

| | | | |
|---|---|---|---|
| 4,403,114 | 9/1983 | Sakoe | 381/42 |
| 4,616,330 | 10/1986 | Betz | 364/728.03 |
| 4,763,278 | 8/1988 | Rajasekaran et al. | 381/43 |
| 4,769,844 | 9/1988 | Fujimoto et al. | 381/42 |
| 4,775,951 | 10/1988 | Iwahashi et al. | 364/728.03 |
| 4,776,017 | 10/1988 | Fujimoto | 381/43 |
| 4,783,802 | 11/1988 | Takebayashi et al. | 381/42 |
| 4,783,803 | 11/1988 | Baker et al. | 381/42 |

FOREIGN PATENT DOCUMENTS

| | | |
|---|---|---|
| 0191354 | 8/1986 | European Pat. Off. |
| 3129282 | 2/1983 | Fed. Rep. of Germany |
| 3129353 | 2/1983 | Fed. Rep. of Germany |
| 3216800 | 3/1988 | Fed. Rep. of Germany |
| 60-198598 | 10/1985 | Japan ............ G10L 7/08 |
| 61-99200 | 5/1986 | Japan ............ G10L 5/06 |

OTHER PUBLICATIONS

Brochure entitled "Voice Master Key a Voice Recognition System," *Voice Master & Speech Thing*, date unknown (ordered Feb. 14, 1989, and obtained by applicant on Apr. 12, 1989).

Fujimoto et al., "Speech Recognition Method Using Binary Time-Spectrum Pattern", *Lecture Papers of Japan Society of Acoustics* (1983), pp. 195–196.

*Primary Examiner*—David D. Knepper
*Attorney, Agent, or Firm*—Mason, Fenwick & Lawrence

[57] ABSTRACT

After sampling a voice signal by a microphone (31), a voice interval is detected by a voice interval detector (32). Then, the voice signal is processed by a frequency analyzer (33) having a predetermined number of channels at a predetermined time interval, whereby a corresponding portion of the voice signal is quantized at each channel. Then, quantized data obtained from these channels are binary converted (34) to thereby form a frame comprised of a series of binary data. Each data of this frame corresponds to one of the channels, and preferably it is set to be an integral multiple of a computer calculation unit (e.g., 4 bits, 8 bits, etc.). When forming a combination frame by superimposing two or more of such frames, the combination frame is divided into layers, whereby it is so structured that each bit is represented by a binary number in each layer. On the other hand, it may also be so structured that one frame is divided in a plurality of sub-frames and a preliminary comparison process is carried out using each sub-frame.

12 Claims, 15 Drawing Sheets

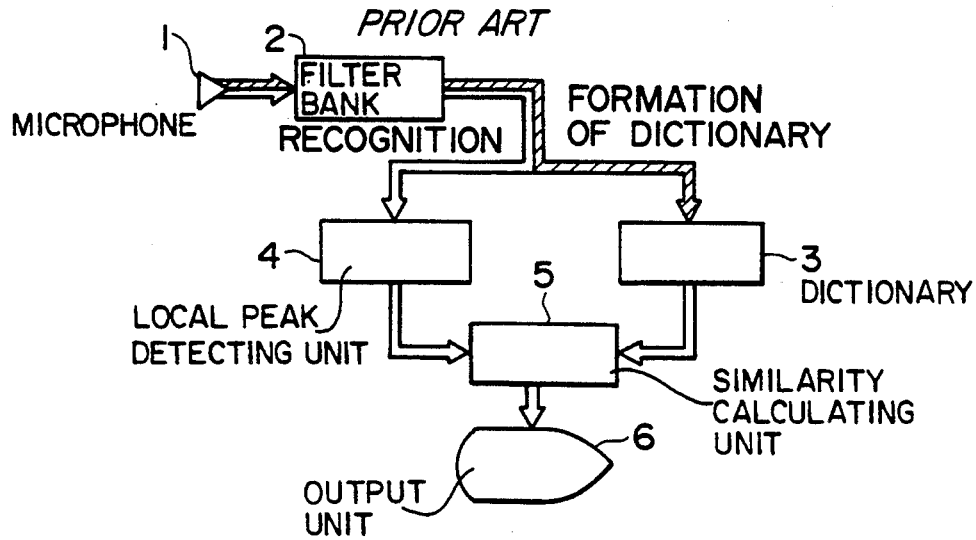
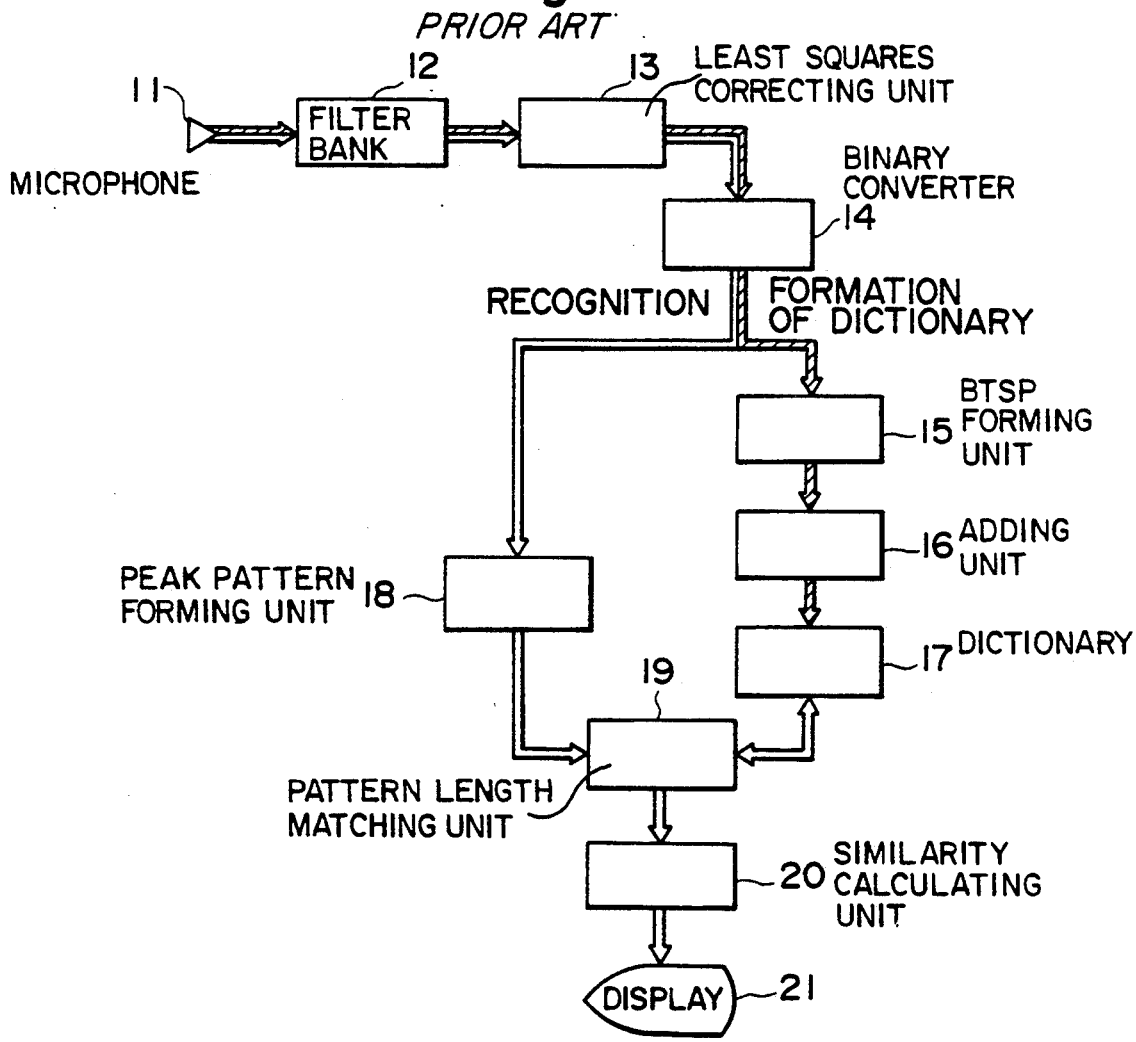

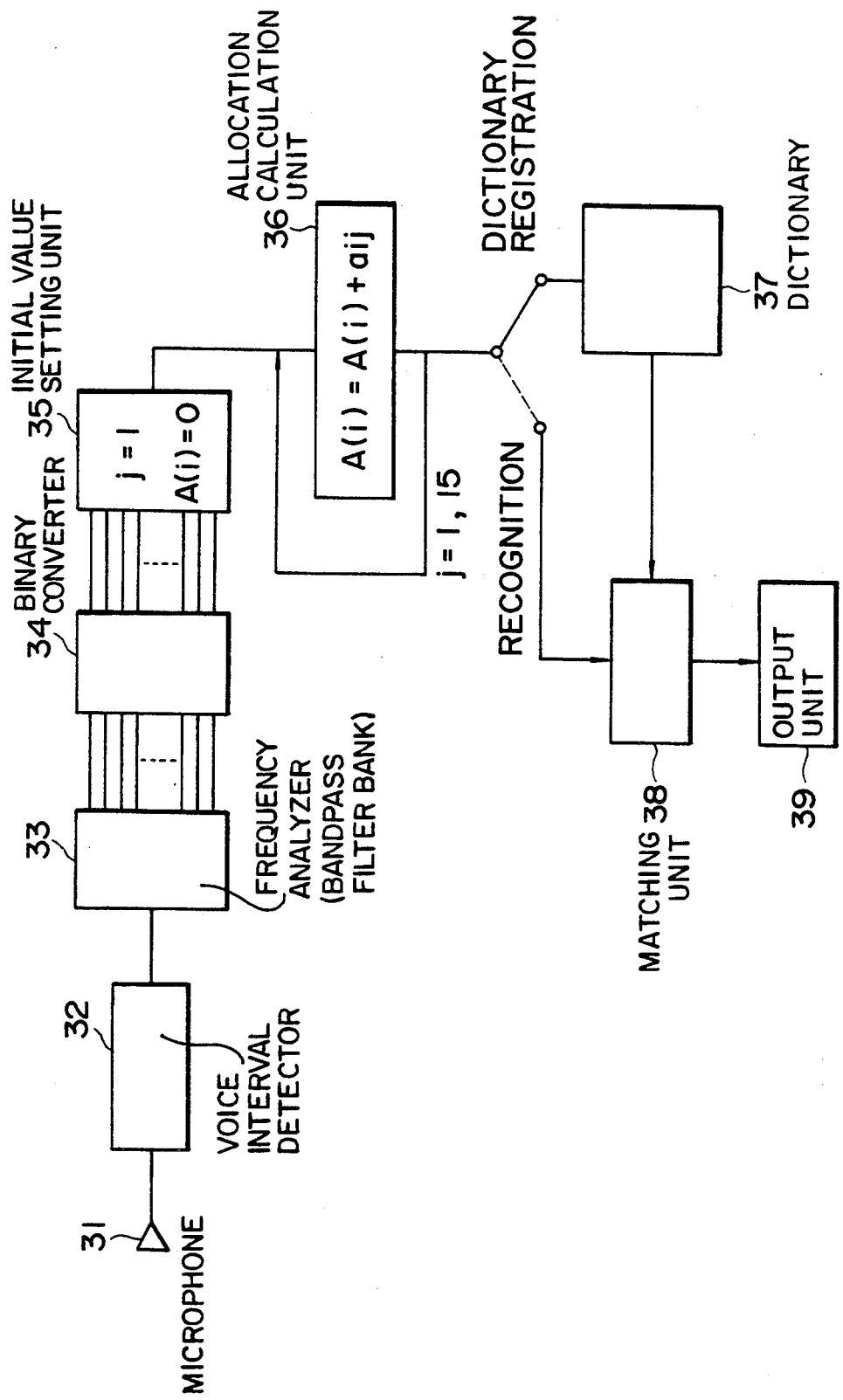

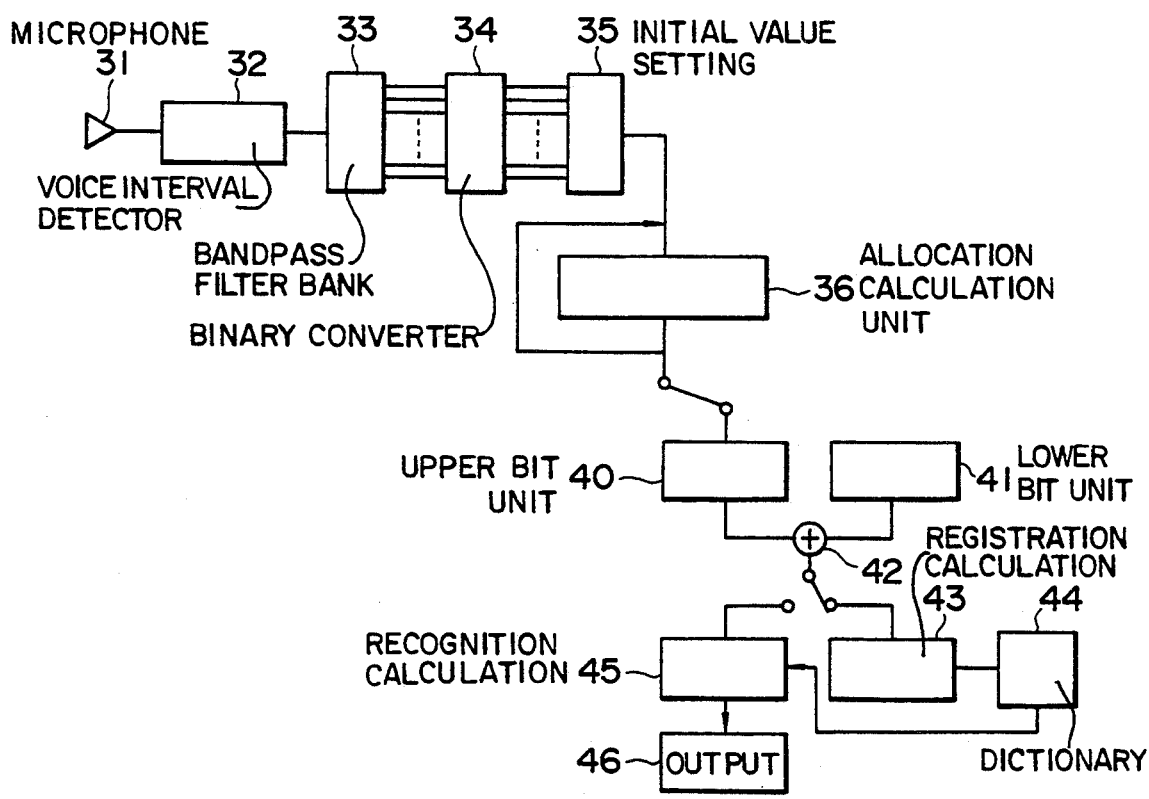

Fig. 13
(a)
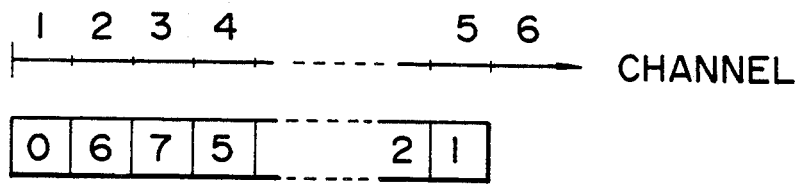
(b)
| 0 | 1 | 1 | 1 | | 0 | 0 | UPPER POSITION |
| 0 | 1 | 1 | 0 | | 1 | 0 | INTERMEDIATE POSITION |
| 0 | 0 | 1 | 1 | | 0 | 1 | LOWER POSITION |
(c)
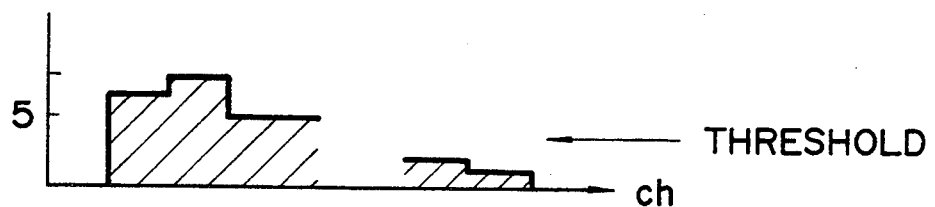
(d)
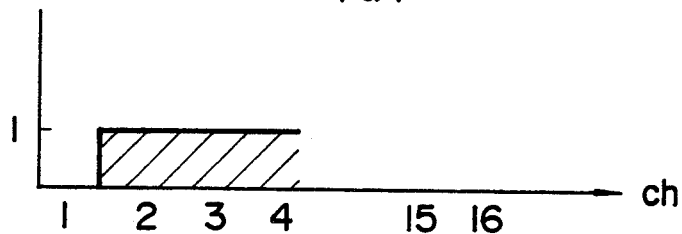

Fig. 16
(a)
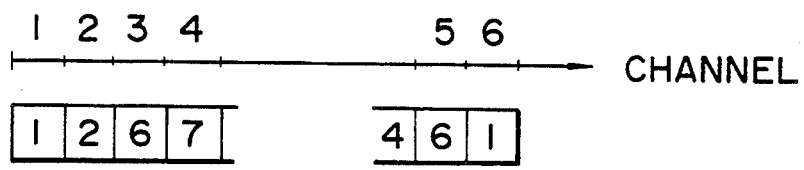
(b)
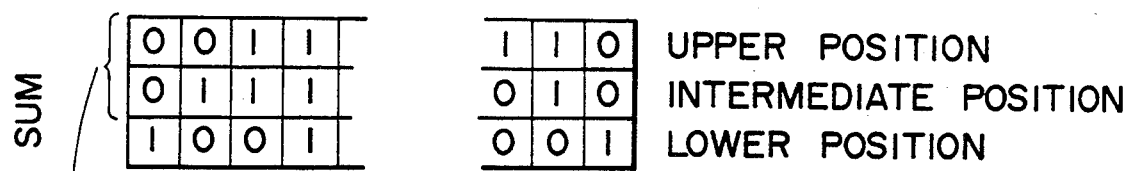
(c)
(d)
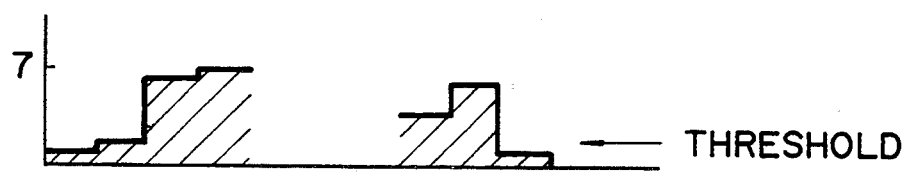
(e)

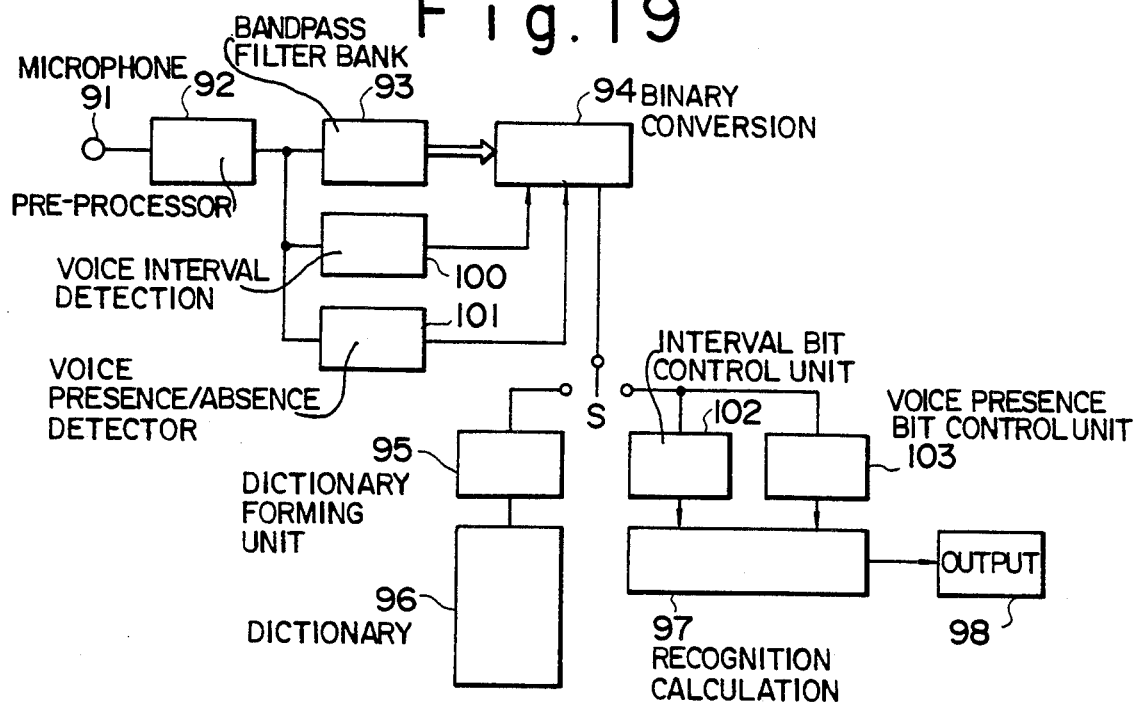
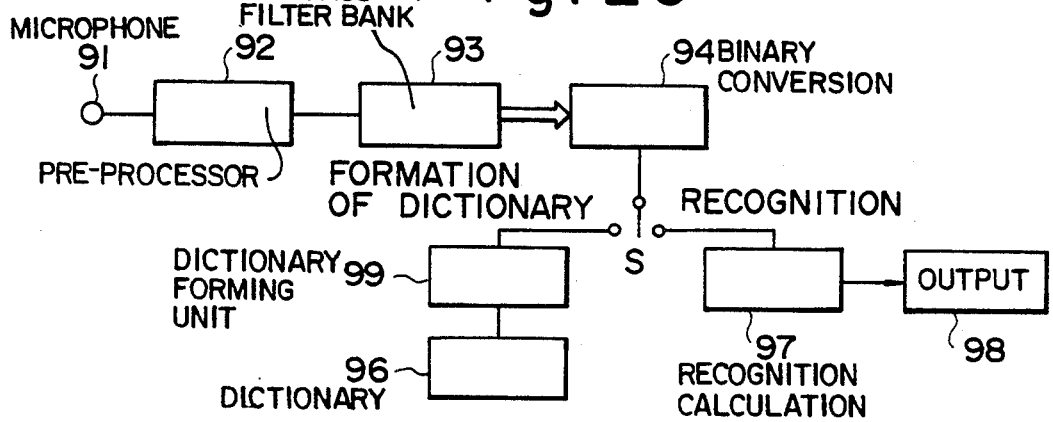
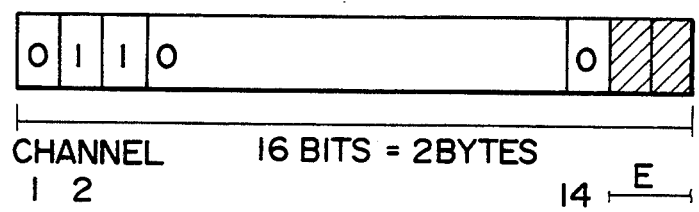

VOICE RECOGNITION SYSTEM AND METHOD INVOLVING REGISTERED VOICE PATTERNS FORMED FROM SUPERPOSITION OF A PLURALITY OF OTHER VOICE PATTERNS

This application is a continuation of U.S. patent application Ser. No. 07/184,446, filed Mar. 29, 1988, now abandoned.

FIELD OF TECHNOLOGY

The present invention generally relates to a voice recognition apparatus, and in particular to a voice pattern matching method and a degree of similarity calculating method for use in a voice recognition apparatus.

BACKGROUND TECHNOLOGY

As a method for recognizing a voice or a word, there have currently been developed a number of systems. Many of these are based on the so-called pattern matching, in which voices to be used are previously registered and an unknown input voice is recognized by examining which of the already registered voices is most similar to a later input voice. The pattern matching method is widely prevalent because the number of calculations is less and the rate of recognition is higher as compared with other methods, such as the one using a discrimination function.

FIG. 1 is a structural drawing for describing one example of the above-described pattern matching method; in the drawing, 1 is a sound collecting device, such as a microphone, 2 is a filter bank, 3 is a dictionary, 4 is a local peak detecting unit, 5 is a degree of similarity calculating unit and 6 is a recognition result output unit. As well known, a voice obtained through a sound collecting device, such as a microphone, is converted into a feature quantity, such as a frequency spectrum, which is used to form a feature pattern for pattern matching. At this time, since the value of one spectrum is represented by ordinarily allocating 8–12 bits, if $\underline{m}$ number of samples are taken on frequency, one time sample (1 frame) can be represented by $8 \times m - 12 \times m$ bits. In general, since one time sample is formed in the order of 10 milli-seconds, a pattern of $\underline{n}$ frames has $8 \times m \times n - 12 \times m \times n$ bits. For a distance which represents a difference between two patterns for pattern matching with one pattern defined by $a_{11}, a_{21}, \ldots, a_{m1}, \ldots, a_{mn}$ and the other pattern defined by $b_{11}, b_{21}, \ldots, b_{m1}, b_{21}, \ldots, b_{mn}$, use is made of the following distance.

$$D = \sum_{ij} |a_{ij} - b_{ij}| \quad (1)$$

That is, according to this method, the comparison of one pattern can be made by executing the calculation of 8–12 bits over i.j times. And yet the above-described example is the case when the two patterns to be compared are same in time length, so that even more calculations are required for equalizing the time length for voices which always change the time length.

One such pattern matching method which is less in the amount of data and which can be executed with simple calculations by using BTSP (Binary Time-Spectrum Pattern) has been presented. (Lecture Papers of Japan Society of Acoustics, p. 195, Autumn, 1983)

FIG. 2 is a structural drawing for describing one example of the above-described BTSP; in the drawing, 11 is a sound collecting device, such as a microphone, 12 is a filter bank, 13 is a correcting unit by the least square, 14 is a binary converting unit, 15 is a BTSP forming unit, 16 is an adding unit of $\underline{n}$ times pronounced patterns by linear expansion and contraction, 17 is a dictionary, 18 is a peak pattern forming unit, 19 is a pattern length matching unit by linear expansion and contraction, 20 is a degree of similarity calculating unit and 21 is a result displaying unit. A voice input through the microphone is subjected to frequency analysis utilizing a bandpass filter bank or the like, whereby frequency and its temporal variation is represented as a pattern (TSP). Furthermore, this is converted into BTSP by binary conversion with a peak in frequency set as "1" and the rest as "0", and BTSPs obtained by a plurality of pronunciations are superimposed and registered as a standard pattern. When an unknown voice has been input, from this voice, a BTSP is formed through a similar process as in the case of forming a standard pattern and compared with a previously registered standard pattern to thereby determine the degree of similarity with each standard pattern. The degree of similarity is obtained by the overlapping condition of elements "1" when the BTSP of the unknown voice is superimposed on the standard pattern. Typically, for an indefinite speaker voice recognition apparatus capable of recognizing an anybody's voice, use is made of a means for increasing the amount of calculations, e.g., forming a plurality of standard patterns for a voice to be registered; however, in accordance with this method, if a standard pattern is formed well, there is a merit of capability to easily realize a voice recognition apparatus for indefinite speakers without increasing the amount of calculations so much.

The degree of similarity S of two patterns defined by this method is expressed as follows.

$$S = \sum_{ij} a_{ij} \cdot b_{ij} \quad (2)$$

Since each of elements a and b is either 1 or 0 or the resultant calculations, although it can be represented even if a large number of bits are not allotted, since it is common to give a unit of computer calculation (4, 8, 16, ... bits), there results a waste for the one which can be realized by the least amount of calculations and the least amount of memory.

Similarly with the above-described method, also in the field of voice recognition, as the number of patterns to be compared increases, a matching method shorter in calculation time for one pattern comes to be required. Comparison may be made with all of the patterns with such a matching method having fewer calculations, or use may be made of a method in which several correct answer candidates are selected by such a simple method and then a fewer number of patterns are finally compared in detail. As a matching method relatively fewer in the amount of calculations, a method using a binary converted time frequency pattern has been proposed.

The apparatus of FIG. 2 recognizes an input pattern and a dictionary pattern obtained by subjecting a voice pronounced with a word as a unit by linear matching. Incidentally, what is shown in FIG. 2 illustrates the definite speaker type, and a voice is registered following the shaded path. In the case of voice recognition for an indefinite speaker, it is so structured that a dictionary is freshly formed as a superimposition of BTSPs.

This method has a merit in that if the filter bank is set at 16 channels, a binary converted result may be treated as an 16-bit data. A series of these 16 data is called a frame. In what is obtained by adding this 16-bit, 2-byte data three times (dictionary pattern or reference pattern), the maximum of one element is 3 so that each element must be represented by two bits.

The present invention has been made so as to obviate the disadvantages of the prior art as described above and has its object to provide a voice recognition apparatus which allows to carry out pattern matching at high speed in particular with a minimum of calculations.

Another object of the present invention is to provide a simple pattern degree of similarity calculating method useful for voice recognition.

A further object of the present invention is to provide a pattern similarity calculating method useful for voice recognition, which allows high-speed processing and minimizes the amount of calculations.

DESCRIPTION OF THE INVENTION

According to one aspect of the present invention, there is provided a voice recognition apparatus including means for collecting a voice; means for converting a collected voice into a plurality of feature quantities; and means for quantizing said feature quantities with an interval which may be regarded as the same time to thereby form a feature pattern. Data sampled at an interval which may be regarded as the same time is uniformly allotted in calculation units of a computer.

In accordance with another aspect of the present invention, there is provided a method of calculating the degree of similarity of a voice pattern by converting a voice into a feature quantity, sampling at a certain time interval to form a series of data at unit time, allotting said series of data to a register having the power of two as a unit, and if one data takes the value equal to 2 or more, treating this as divided in plural units of registers. The degree of similarity with an unknown input pattern is determined using registers equal to or more than one unit of plural units of registers which represent a series of samples and less than the total number of registers, or by executing a logical calculation with a portion of plural units of registers which represent a series of samples to thereby form a new pattern and determining the degree of similarity with an unknown, input pattern.

This aspect of the present invention has been made by paying attention to the fact that each element of a series of data is uniformly allotted to each bit of each of upper and lower register units. For example, there is provided a method of calculating the degree of similarity of a voice pattern by converting a voice into a feature quantity, sampling at a certain time interval to form a series of data at unit time, allotting said series of data to a register having the power of two as a unit, and if one data takes the value equal to 2 or more, treating this as divided in plural units of registers. The degree of similarity with an unknown input pattern is determined using registers equal to or more than one unit of plural units of registers which represent a series of samples and less than the total number of registers.

In accordance with a further aspect of the present invention, in a method for comparing the degree of similarity by converting a voice into a feature quantity, sampling at a constant time interval to form a set of data, allotting said set of data to a register having the power of 2 as a unit, if one data has the value equal to or more than 2, treating this as divided in a plurality of sets of registers, and calculating a degree of similarity to compare the magnitude of the degree of similarity, there is provided a method for comparing the degree of similarity of a pattern. The method is characterized in that, when calculating the degree of similarity by matching an unknown pattern with previously registered standard patterns in sequence, the already obtained degrees of similarity are retained as divided in a plurality of registers and that a value obtained by comparing a portion of the next standard pattern and an input is compared with the value within the registers for a portion of the already obtained degree of similarity, whereby the calculation of the degree of similarity with the current standard pattern is terminated if the former value is larger.

In accordance with a still further aspect of the present invention, there is provided a voice pattern matching method by converting a voice into a feature quantity, sampling at a certain time interval to form a pair of data at unit time, allotting said pair of data to a register having the power of 2 as a unit, and if one data has a value equal to or larger than 2, treating this as divided over a plurality of unit registers, characterized by allotting feature quantities of second, . . . , nth (here, n is an integer) obtained by means separate from said feature quantity to a certain bit of the same data and controlling pattern matching of the original feature quantity based on this information.

This aspect of the present invention has been made in view of the disadvantages of the prior art as described above and its control information is contained in BTSP data to thereby increase the speed of calculations and determination and also the recognition rate.

Fundamentally, the BTSP system produces many advantages if the formant information of a voice is represented by a binary data of 0 and 1 and calculations are carried out by treating as a 16-bit data as described before.

This aspect of the present invention is furthermore purported to carry out calculations at even higher speed by allocating the information, which is necessary for recognition calculations and can be determined to be either 0 or 1 by one sample data of one pronunciation, to an empty channel of the above-described BTSP data and carrying out calculations with the before-mentioned data structure.

BRIEF DESCRIPTION OF THE DRAWINGS

FIGS. 1 and 2 are block diagrams showing prior art voice recognition apparatuses;

FIG. 9 is a block diagram showing a voice recognition apparatus constructed based on one embodiment of the present invention;

FIG. 10 is an illustration showing an example in the case of forming a standard pattern from BTSP for which the same voice has been pronounced over three times;

FIG. 11 is a block diagram showing another embodiment of the present invention;

FIG. 13 is an illustration useful for understanding the method of FIG. 12;

FIG. 16 is an illustration useful for describing the method of FIG. 15;

FIG. 19 is a block diagram showing an apparatus suitable for practicing a pattern matching method according to one embodiment of the present invention;

FIG. 20 is a block diagram showing one example of a prior art pattern matching system;

FIG. 21 is an illustration showing a binary data;

BEST MODE FOR PRACTICING THE INVENTION

Figure 3:
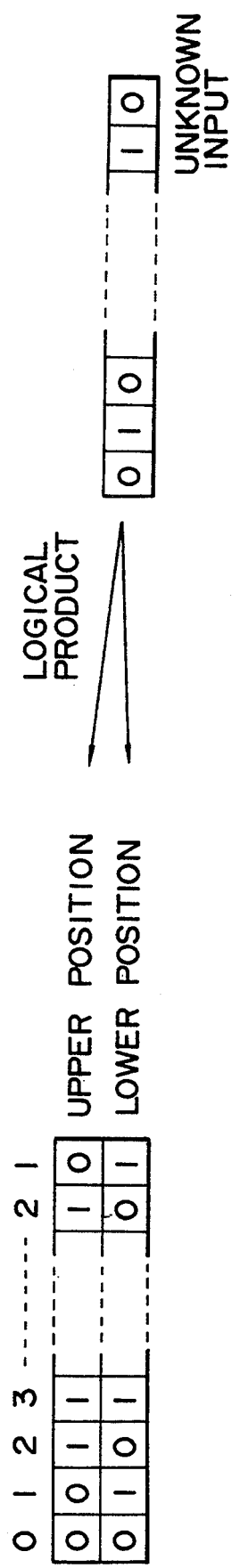
FIG. 3 is a schematic illustration showing one example of a prior art method for calculating the degree of similarity of a pattern.
Figure 5:
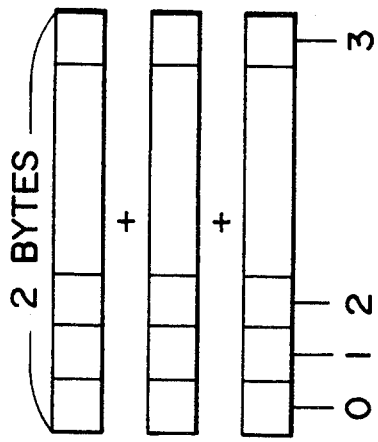
FIG. 5 is an illustration showing one example in the case when a binary data is superimposed over three times.

As illustrated in FIG. 3 (and in contrast to known systems described in the Background section, above), two bits are divided between an upper and a lower position, whereby an upper frame is allotted to a two-byte data word and the lower position is allotted another two bytes. That is, a two-byte horizontal row corresponds to sixteen filters of the filter bank. At the time of pattern matching, if an unknown input is represented by one frame (two bytes when binary converted), a product of the value of each of the channels can be easily obtained; the easy logical product calculation is obtained, with bitwise correspondence between the unknown input and each of the bytes of the upper and lower positions of the four-byte pattern.

Figure 4:
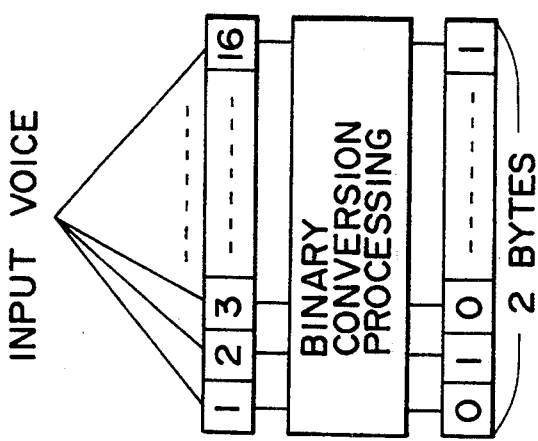
FIG. 4 is an illustration showing an allocating manner of allocating outputs of sixteen filters to a 2-byte register.
Figure 6:
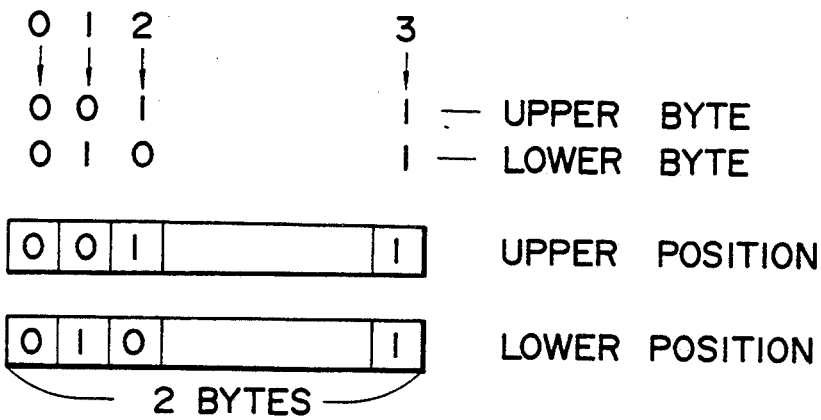
FIG. 6 is an illustration showing an example in which the result of superimposition shown in FIG. 5 is represented by upper and lower two bytes.
Figure 7:
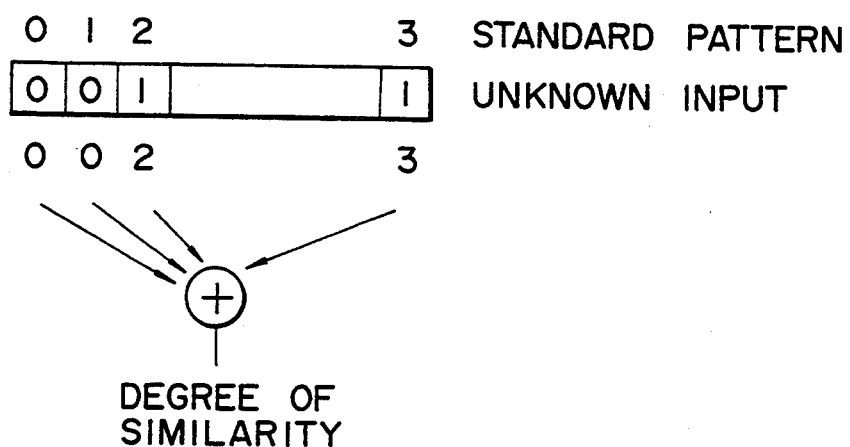
FIG. 7 is an illustration showing one example for determining the degree of similarity between a standard pattern and an unknown input.

In the particular example shown in FIG. 6, the value of outputs of filters are represented by binary numbers, with the upper position being represented by a set of two bytes, and the lower position represented by another set of two bytes. This is a set standard pattern; in order to determine the degree of similarity with an unknown input pattern (formed as shown in FIG. 4), both of them are superimposed as shown in FIG. 7 to determine a product of corresponding bits; the product is determined as the degree of similarity.

Figure 8:
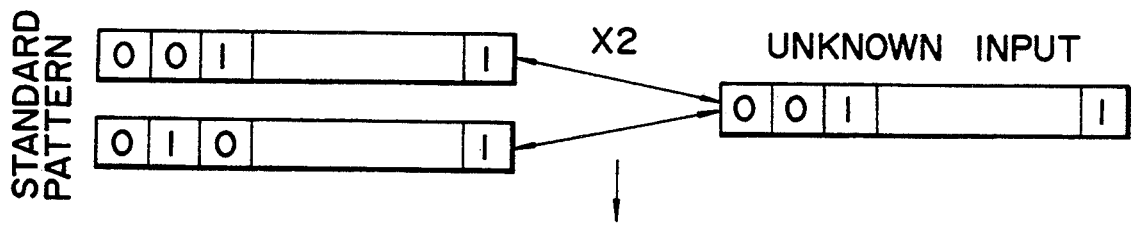
FIG. 8 is an illustration showing an example of a system for comparing the degree of similarity of a pattern to which the present invention is applied.

However, such calculations are cumbersome and time-consuming, and thus a method shown is FIG. 8 is conceivable. A standard pattern is divided between upper and lower positions as shown in FIG. 6 and an unknown input is superimposed on the upper position to obtain a logical product of each bit. Similarly, for the lower position, a logical product is obtained; and total of the value of each bit of the upper position is multiplied by two or added twice and the sum of the bits of the lower bit is added to obtain the same result as that of FIG. 7 (determined to be the degree of similarity). While obtaining the degrees of similarity between the unknown input pattern and all the registered standard patterns, the unknown input is considered to be classified to the standard pattern having the largest degree of similarity so that the label assigned to the standard pattern is output as the result of recognition. In this manner, the degree of similarity can be simply calculated.

FIG. 9 shows a voice recognition apparatus constructed on the basis of one embodiment of the present invention.

In the drawing, 31 is a voice collecting device, such as a microphone, 32 is a voice interval detecting unit; 33 is a bandpass filter bank, 34 is a binary converting unit, 35 is an initial value setting and selection circuit; 36 is an allocation calculating unit, 37 is a dictionary; 38 is a matching unit; and 39 is a result outputting unit. In this embodiment, a voice recognition apparatus including means for collecting a voice, means for converting a collected voice into a plurality of feature quantities and means for forming a feature pattern by quantizing said feature quantity by an interval which may be regarded as the same time. And, calculations are carried out while allocating the data sampled by an interval which may be regarded as the same time uniformly in computer calculation units (4 bits, 8 bits, 16 bits, etc.), thereby setting the number of feature vectors quantized by an interval which may be regarded as the same time to be an integer multiple of 4 and representing the elements of each vector by 1 or 0 by binary conversion to calculate as unit vectors.

That is, in the embodiment shown in FIG. 9, in the first place, a voice is collected by a microphone and only a voice interval is extracted by an interval detecting unit for separating from noise or the like, and then it is subjected to frequency analysis by a bandpass filter bank 33 to thereby have it binary converted. Incidentally, any well-known method may be applied for the binary conversion process of a pattern.

Then, for a voice to be used, its binary converted pattern (BTSP) is formed and registered in advance as a standard pattern, and an input, unknown voice is also converted into BTSP, which is compared and matched with the standard patterns to thereby determine the standard pattern highest in similarity as a recognition result.

In FIG. 9, an output of each of fifteen bandpass filters is represented in the order of 8 bits; however, in accordance with this described method, an output of each bandpass filter of these after binary conversion is represented by sixteen bits. That is, the value of a first channel is allocated to the lowest bit of sixteen bits while allocating gradually to higher bits as second, third, ... . A manner of allocation may, for example, be carried out as follows.

$$A(i) = \sum_j 2(j-1) \cdot a_{ij} \qquad (3)$$

Here, i is a frame number; j is a channel number of a filter; and $a_{ij}$ indicates each element of BTSP similar with equations (1) and (2). With this, the degree of similarity S as shown in equation (2) can be expressed as follows.

$$S = \Sigma A(j) \wedge B(j) \qquad (4)$$

Here, $\wedge$ indicates a logical product for each bit. That is, in equation (2), it was necessary to obtain a product of each element; whereas, in equation (4), it is only necessary to calculate a logical product for each frame.

Therefore, the amount of memory which has heretofore been required to represent one pattern is reduced and the speed of calculation is increased. In this case, the efficiency varies depending on the number of bandpass filters to be selected.

FIG. 10 shows an example in which, in a definite speaker system, a standard pattern is formed by superimposing three pronounced BTSPs for one voice (Lecture Papers of the Japanese Society of Acoustics, p. 195, Autumn, 1983), and in this figure, one frame corresponding to BTSPs formed when pronounced over three times is shown as extracted. By superimposing in this manner, each element of a standard pattern comes to have a value of 0-3, so that it cannot be represented by a binary value. As readily appreciated by those skilled in the art upon a review of FIG. 10, the term "superimposing" as used herein follows the common usage of the term, denoting an addition of corresponding elements of plural patterns, to form what is here called a "superimposed pattern".

FIG. 11 shows an embodiment which has been improved on the above-described disadvantage. In the drawing, 40 is an upper bit unit; 41 is a lower bit unit; 42 is an adder unit; 43 is a registration calculation logic unit; 44 is a dictionary unit; 45 is a recognition calculation logic unit; and 46 is a result output unit. The remaining 31 through 36 correspond to 31 through 36 of the embodiment shown in FIG. 9. Thus, in the present embodiment, there is defined a voice recognition apparatus including means for collecting a voice, means for converting this into a plurality of feature quantities, and means for forming a feature pattern by quantizing said feature quantities at an interval which may be regarded as the same time. And, the data which has been sampled at an interval which may be regarded as the same time is uniformly allocated among computer calculation units (4 bits, 8 bits, 16 bits, ...) and calculated, and then the number of feature vectors to be quantized by an interval which may be regarded as the same time is arranged to be an integer multiple of 4. And an element of each vector is represented by 1 or 0 by a binary conversion process so that it can be calculated as a unit vector. And, when a feature vector ceases to be a unit vector as a result of calculation, each element of the vector is represented by a binary number, whereby a new vector is created according to its position for calculation. As shown in FIG. 10, when a standard pattern is formed by superimposing BTSPs produced by pronouncing the same voice over three times, each element of the standard pattern has a value of 0-3. Thus, the number of bits required for representing one element is 2 bits. On the other hand, since an input voice is converted into an ordinary BTSP, each element is represented by one bit, so that the calculation for the degree of similarity between the two becomes very complicated. In accordance with the method proposed here, these two bits are divided into upper and lower position bits, whereby the upper position with the amount of 15 CH is represented by one word, i.e., 16 bits, and the lower position is represented by another word. With this, the degree of similarity S can be determined by the following equation.

$$S = \sum_j (Ah(j) \wedge B(j)) U(Al(j) \wedge B(j)) \qquad (5)$$

Here, h and l indicate the upper and lower position bits, respectively, and U indicates a logical sum. A product of two patterns represented by equation (2) can be obtained by a product of two words and a sum of these results as in equation (5). In the case of an indefinite speaker system, since a standard pattern is formed by superimposing approximately 10 BTSPs for one voice, one element in a pattern is represented by four bits. In this case, similarly with the previous example, four bits are divided and allocated to separate words, whereby each word is treated as a unit vector representing 1–15 CH. Incidentally, each embodiment of the present invention has been described above; however, it may be easily understood that the present invention may be realized either by software or by hardware.

As is obvious from the above description, in accordance with one aspect of the present invention, the amount of memory for standard patterns is reduced and the calculation for the degree of similarity is reduced, thereby allowing to increase the speed of recognition. In addition, when determining "number M of elements having 1 twice or more among three pronunciations in a standard pattern" (in the case of a definite speaker system), which is the information auxiliarily used for calculating the degree of similarity, there is a merit that it can be easily determined if the following calculation is made.

$$M = \sum_j Ah(j) \wedge l$$

Here, l indicates a unit vector whose elements are all 1.

Figure 12:
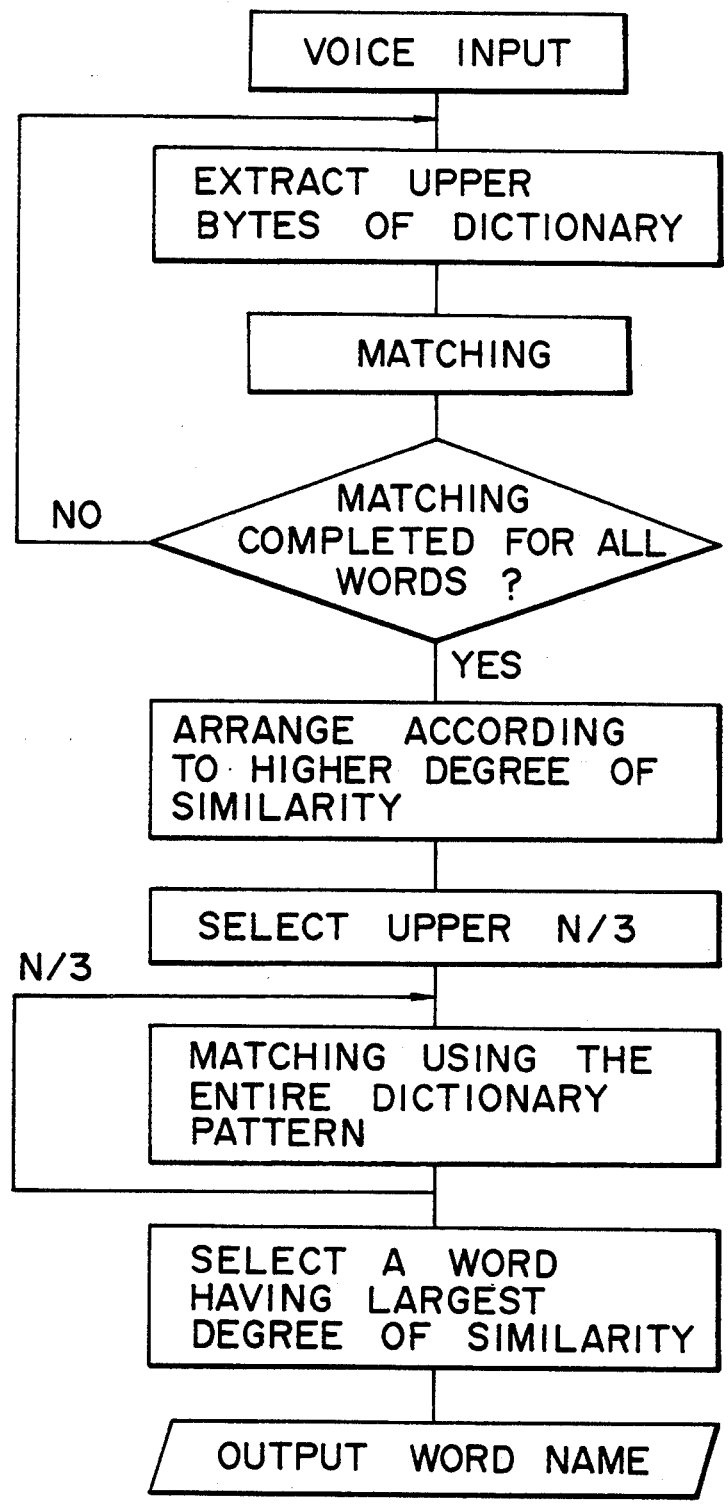
FIG. 12 is a flow chart showing each step of a method for calculating the degree of similarity of a pattern based on one embodiment of the present invention.
Figure 14:
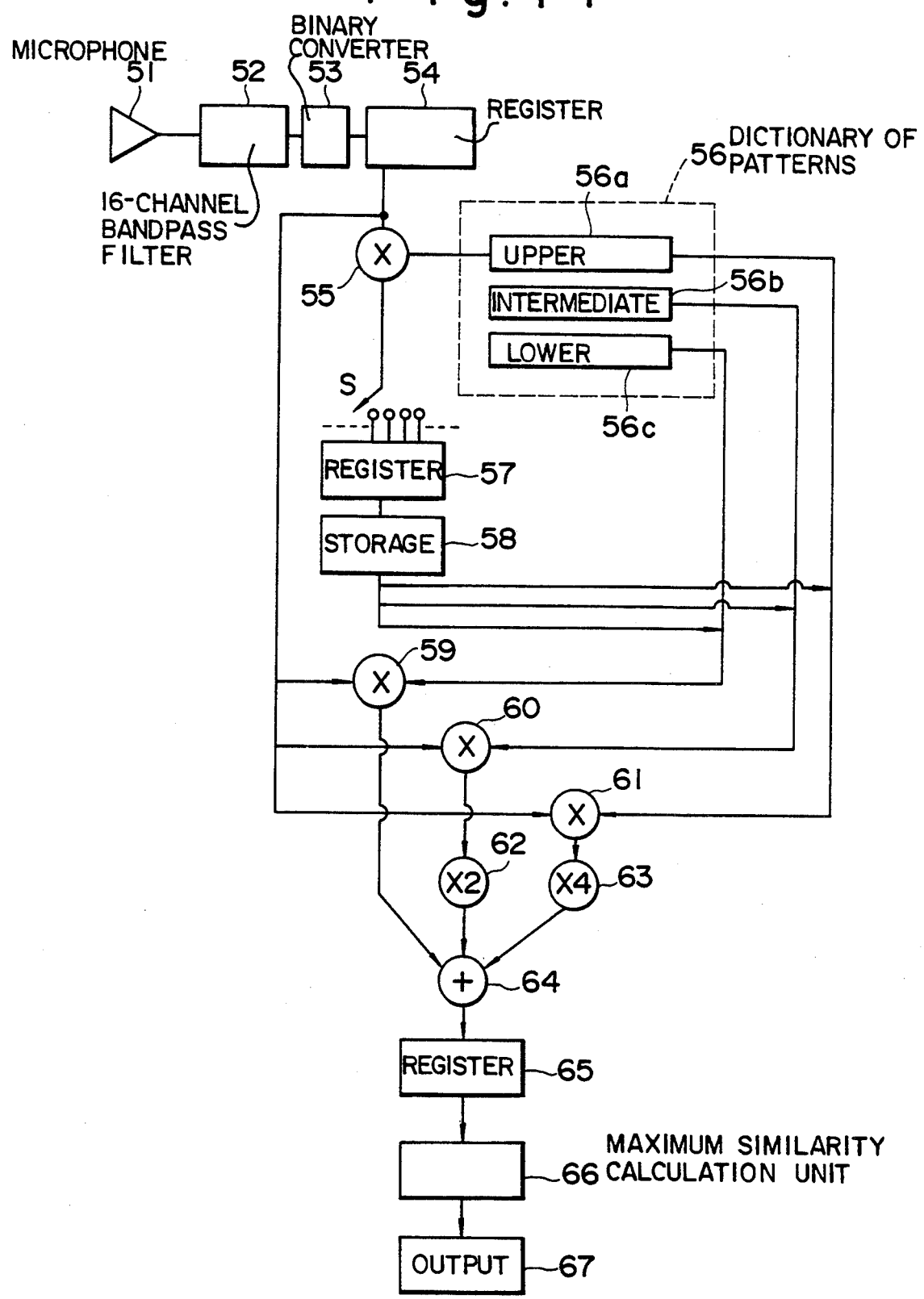
FIG. 14 is a block diagram showing one example of an apparatus suitable for practicing the method shown in FIG. 12.

FIG. 12 is a flow chart for describing one embodiment of a method for calculating the degree of similarity of a pattern of the present invention; FIG. 13 is a drawing showing a pattern example for describing the embodiment shown in FIG. 12; and FIG. 14 is a drawing showing one example of an apparatus suitable for practicing the embodiment shown in FIG. 12. In FIG. 14, 51 is a microphone; 52 is a 16-channel bandpass filter; 53 is a binary conversion unit; 54 is a register; 55 is a multiplier unit; 56 is a dictionary pattern (here, 56a is an upper position byte; 56b is an intermediate position byte; and 56c is a lower position byte); 57 is a register; 58 is a portion for storing N/3 number of names of the upper position; 59–63 are multiplier units; 64 is an adder unit; 65 is a register; 66 is a maximum degree of similarity calculation unit; and 67 is a result output unit. In the first place, an input voice is converted into a feature quantity and matched with the upper byte of a dictionary pattern. Since the input pattern is binary converted and it is represented by a series of two bytes, the degree of similarity between the two can be determined by taking a logical product between the upper byte of FIG. 13 (b) and this input byte. This corresponds to the determination of a correlation between elements of 4 or more in the pattern of FIG. 13 (a) and the input and is equivalent to the determination of a correlation with the input pattern by binary coverting the value ranging from 0 to 7 of FIG. 13 (a) with 4 as a threshold value. Since it is changed to one byte as compared with the prior art which used three bytes of upper, intermediate and lower bytes, the calculation is reduced to ⅓, but of course the accuracy of calculation is also reduced. Thus, if the number of registered words is set at N as shown in FIG. 12 and the candidates are reduced, for example, to N/3 by this method while carrying out the normal matching to the remaining words, the total amount of calculation will be 2N, i.e., the preliminary calculation N plus the normal calculation 3.N/3 in contrast to the prior art which required the amount of calculation 3N because 3-byte calculation was carried out for N words, so that the amount of calculation is reduced to ⅔. Of course, there appears a difference in the amount of reduction depending on the number of words to remain as a result of the preliminary selection method and the structure of a dictionary pattern.

In FIG. 14, a dictionary pattern is previously registered as being divided among upper, intermediate and lower position bits. It may be so structured that this can be registered within the apparatus; however, since the method of this registration does not affect the present invention, its detailed description will be omitted. In the first place, when an unknown input enters, it passes through the 16-channel bandpass filter, whereby a frequency analyzed result is sampled as a series of data (frame) for example at about 10 ms and stored in the register 54. A logical product between the upper position byte of a dictionary pattern and the input pattern of the register is determined and a total of its 16 channel portion and time length portion is stored in the register 57. In this case, although not described in particular, for the method of equalizing the time length of the two patterns, a method using the before-described BTSP may be used as an example. Here, a pattern (FIG. 13 (d)) which has been obtained by binary converting FIG. 13 (c) by converting 4 or more to 1 is compared with an input pattern and the degree of similarity between two patterns is defined by the number of overlapping portions between the two. This degree of similarity is stored into the register 57 in the order of matching, from which word names or word numbers falling into the upper position N/3 are extracted, and the entire dictionary patterns corresponding thereto are taken out, followed by the step of taking a logical product with the pattern of binary converted input voice stored in the register 54. In this case also, similarly with the previous logical product, the results of products are totalled for 16 channel portions and time length portions. A product between the result of a product with the lower position byte and the intermediate position byte is determined and then a sum of twice the result and four times of the same thing of the upper position is determined. In this manner, the degree of similarity representing the degree of overlapping condition between the pattern of FIG. 13 (c) and the input pattern is obtained, and the maximum of such results is output as the result of recognition. In this manner, the candidates for which strict matching is to be carried out can be reduced in number by such a simple calculation, and as a result, the overall amount of calculation can also be reduced. Here, matching with the upper position byte has been described; however, matching may also be carried out with the intermediate position byte as well as the upper position byte, though the amount of calculation will increase as compared with the case with the upper position alone. However, in accordance with this method, when a dictionary is represented by one set of bytes, it is equal to that which has been binary converted by setting the threshold value to ½ of the maximum value of the original dictionary and the threshold value cannot be shifted otherwise. Under the circumstances, it has been so structured to carry out logical calculations by a portion of a register of plural units representing a series of samples, form a new pattern and then to determine the degree of similarity with the unknown input pattern.

Figure 15:
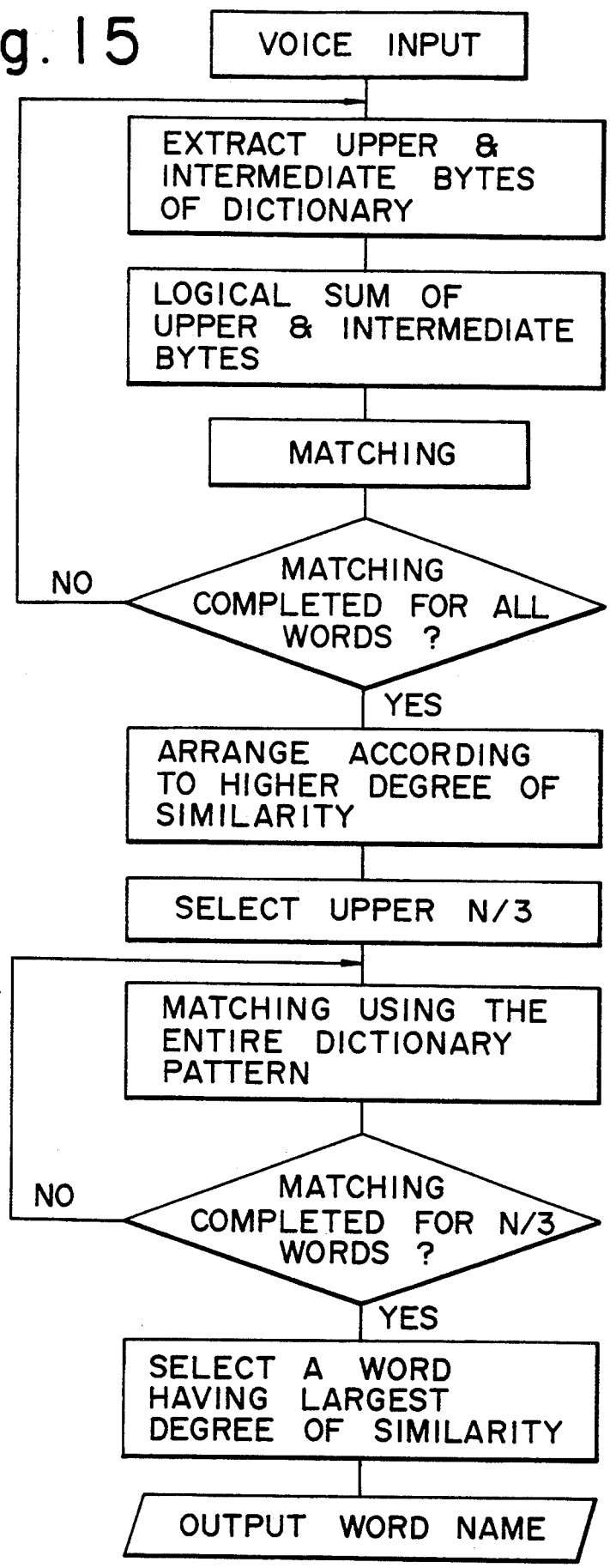
FIG. 15 is a flow chart showing each step of a method for calculating the degree of similarity of a pattern based on another embodiment of the present invention.
Figure 17:
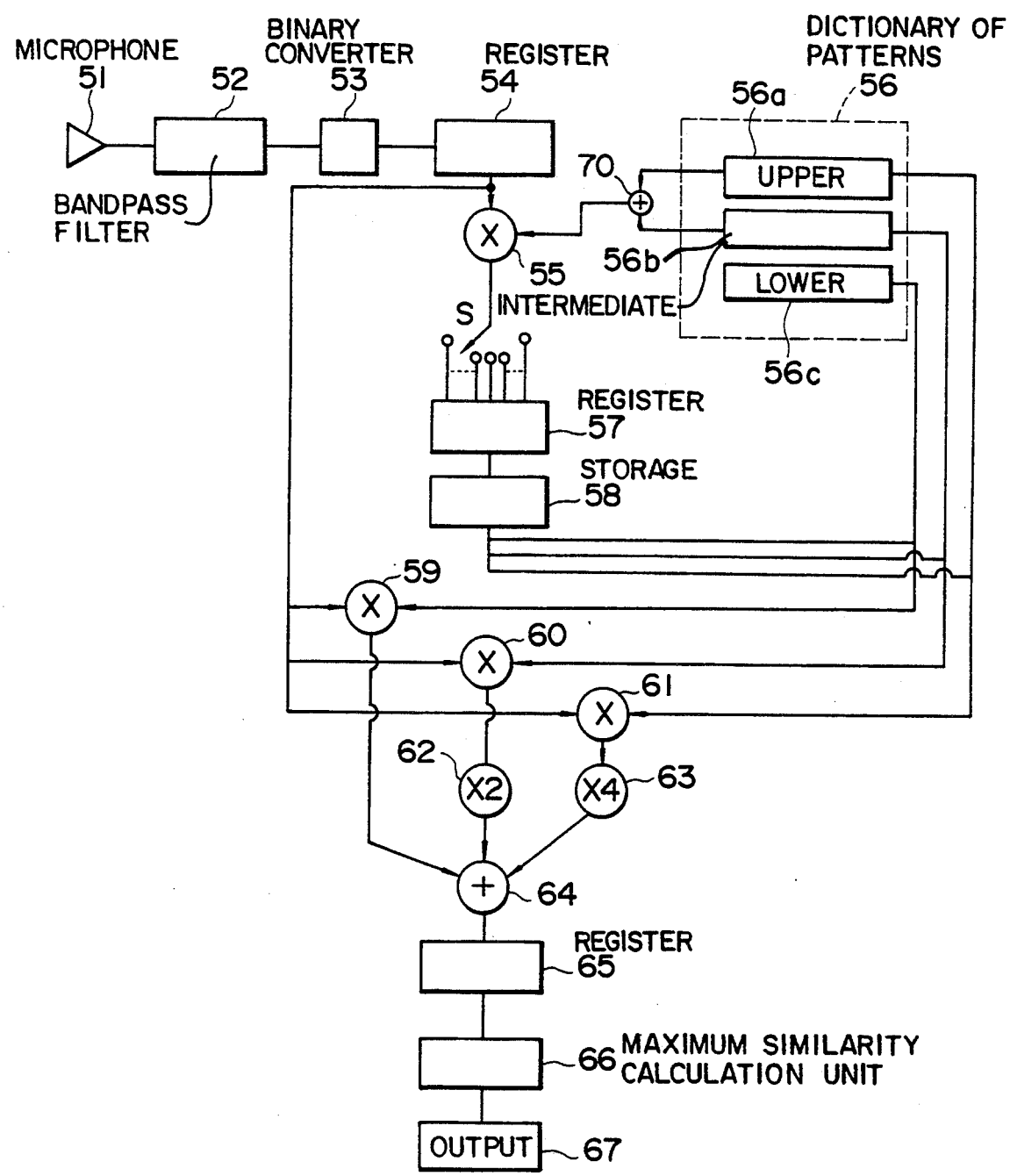
FIG. 17 is a block diagram showing one example of an apparatus suitable for practicing the method shown in FIG. 15.

FIG. 15 is a drawing for describing one embodiment for that case; FIG. 16 is a drawing showing a pattern example for describing the embodiment shown in FIG. 15; and FIG. 17 is a drawing showing one example of an apparatus suitable for practicing the embodiment shown in FIG. 15. In FIG. 17, 70 is an adder and those portions whose functions are similar to those devices shown in FIG. 14 are indicated by the same reference numbers in the case of FIG. 14. For the brevity of description, hereinafter, only the differences with the embodiment shown in FIGS. 12 through 14 will be described. Now, in the present embodiment, prior to matching between an input voice and the upper position byte of a dictionary, a logical sum between the upper and intermediate position bytes of a dictionary is determined and then matching between this result and the input is carried out. The pattern obtained by the logical sum between the upper and lower positions of FIG. 16 (b) is as shown in FIG. 16 (c), which is equal to a pattern of FIG. 16 (d) and thus is in agreement with the case in which the threshold value of the before-described embodiment has been lowered. If use is made of a logical product instead of a logical sum, this will be tantamount to the case in which the threshold value is increased to 6 as compared with the before-described embodiment. In this manner, it comes to be able to vary the threshold value by increasing one logical calculation. A specific apparatus of the embodiment shown in FIG. 15 will be as shown in FIG. 17, and the difference from the apparatus shown in FIG. 14 resides in that a dictionary pattern for use in preliminary matching is formed by a logical sum between the upper and intermediate positions of the dictionary.

According to this embodiment, since, while using both bits of the upper and lower positions, the two are matched after compression without separately matching the two, the amount of calculation for matching is not much increased as compared with the case of matching with the upper byte only.

Incidentally, in the above, a bit structure of three kinds, i.e., upper, intermediate and lower positions, was used; however, it does not have to be three kinds and four kinds or more may be used, and as the number of kinds increases, the effect of an increase in speed becomes conspicuous. Although the degree of similarity has been described to be obtained by a logical product in accordance with prior art, it goes without saying that the present invention should not be limited only to this.

Figure 18:
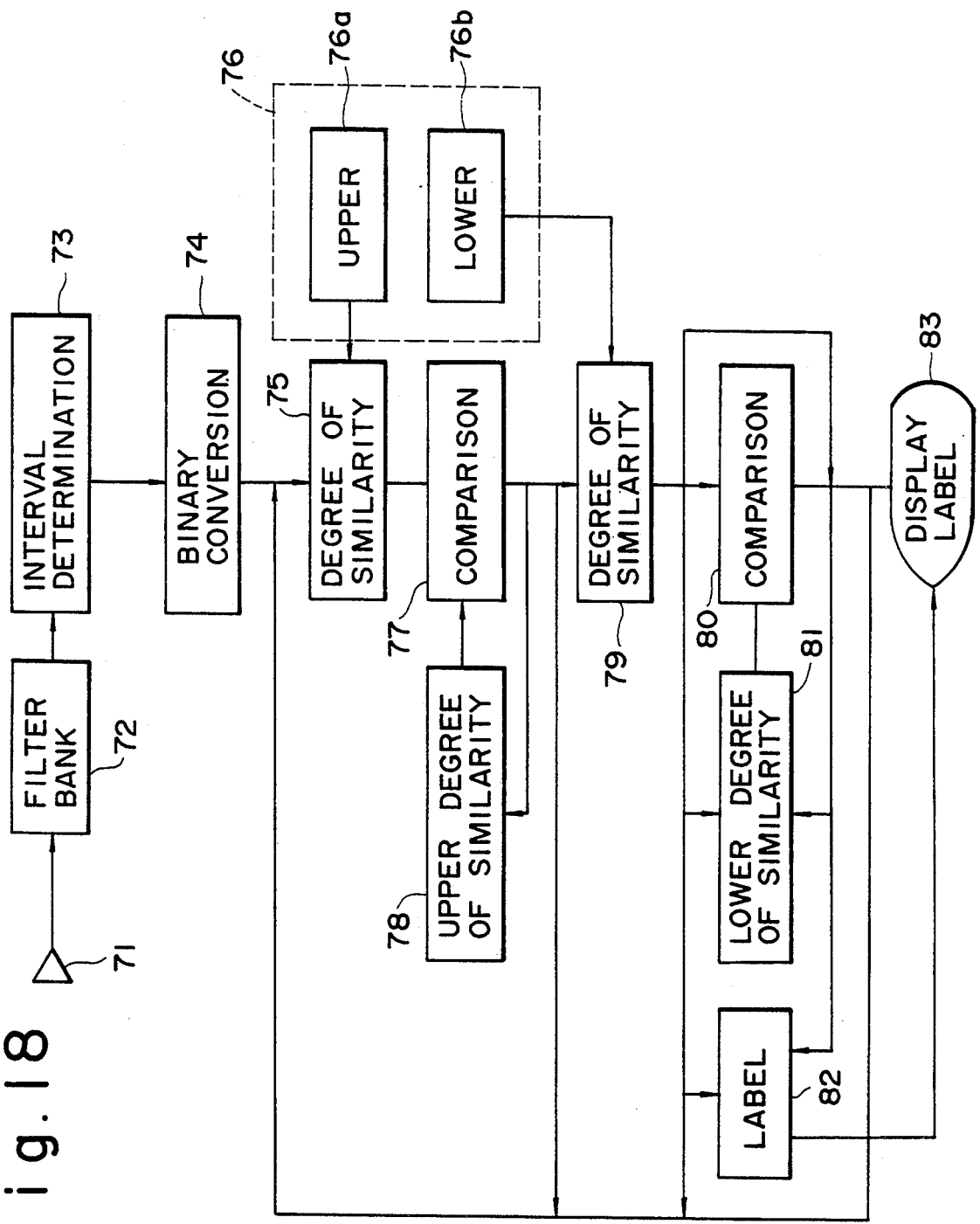
FIG. 18 is a block diagram showing an apparatus suitable for practicing a method for comparing the degree of similarity of a pattern based on one embodiment of the present invention.

FIG. 18 is a block diagram showing one embodiment of a method for comparing the degree of similarity of a pattern of the present invention. In the drawing, 71 is a microphone; 72 is a filter bank (feature extraction unit); 73 is a voice interval extracting unit; 74 is a binary conversion unit; 75 is a degree of similarity calculating unit; 76 is a dictionary; 77 is a comparing unit; 78 is an upper position degree of similarity calculating unit (degree of similarity register); 79 is a degree of similarity calculating unit; 80 is a comparing unit; 81 is a lower position degree of similarity calculating unit (degree of similarity register); 82 is a label unit (label register); and 83 is a label display unit. In the first place, it is assumed that a reference pattern is previously registered in the dictionary register 76. It is assumed that one frame of each reference pattern has two layers of upper position 76a and lower position 76b and these are stored in separate registers. At first, with the degree of similarity registers 78 and 81 cleared to be 0, an input voice is produced toward the microphone 71. Here, the feature extraction unit 72 is shown to be constructed by a filter bank of sixteen bandpass filters so as to carry out frequency analysis; however, it may be replaced by a feature parameter, such as a linear prediction coefficient, if desired. At the interval extracting unit 73, using a feature extracted parameter, a voice portion is extracted from the unnecessary sound to thereby carry out interval detection. The sequence of feature extraction and interval detection is not particularly limited, and either can be carried out first. As an interval detection method, since the energy of a microphone output increases when a voice has been input, a method utilizing a variation of its energy is often used. An interval may also be determined by a variation of spectrum. Its result is binary converted by the binary conversion unit 74. As a method of binary conversion, any well known method may be used. A binary converted data may be represented by two bytes for one frame. The degree of similarity with the upper position of a first standard pattern is determined for example by a method described previously and is compared with the upper position degree of similarity of the degree of similarity register 78. Now, if the thus determined degree of similarity is larger than the degree of similarity in the register, the current degree of similarity is stored in the register 78 as it is, and then the degree of similarity between the input and the lower position of the standard pattern is determined, which is stored in the degree of similarity register 81 while storing the label of its standard pattern in the label register 82. In the case of matching with the first standard pattern, since each degree of similarity register has been reset and contains 0, the contents is necessarily rewritten. Next, the degree of similarity with the upper position of the second standard pattern in the dictionary is determined and a similar operation is repeated. In this case, if the degree of similarity of the upper position is larger than the register 78, the current degree of similarity is substituted into the register 78 and the degree of similarity of the lower position is determined, which is entered into the register 81 without condition. If the degree of similarity of the upper position is the same as that of the register 78, the degree of similarity is determined immediately and then this is compared with the value of the register 81, whereby its degree of similarity is entered into the register 81 only when the thus determined degree of similarity is larger. In the case when the degree of similarity is substituted into the register 81, the current label is also entered into the label register 82 without fail. On the other hand, if the degree of similarity of the upper position is smaller than the contents of the register 8, it immediately proceeds to matching with the next standard pattern. 10 Such an operation is repeated over the number of standard patterns registered in the dictionary, and upon completion, the label stored in the label register 82 is output as a result of recognition. By using this method, the faster in matching with standard patterns to obtain the maximum degree of similarity, the lower the number of matching of the lower positions and the amount of calculations. Thus, the speed of recognition can be increased.

What has been described is an example in which a standard pattern has a two-layer structure of upper and lower positions; however, this may be three layers or more, and as the number of layers increases, the degree of effects becomes more significant. In addition, in this matching, matching with all of the standard patterns has been assumed; however, the present system may be applied after carrying out preliminary matching.

FIG. 20 is a drawing for describing the overall structure of a prior art voice recognition system. In the drawing, 91 is a microphone; 92 is a pre-processing unit; 93 is a 14-channel bandpass filter bank; 94 is a binary conversion calculating unit; 95 is a dictionary forming unit; 96 is a dictionary; 97 is a recognition calculation unit; and 98 is a result output unit. A voice input through the microphone 91 is corrected in level by the pre-processing unit 92 and then input into the 14-channel bandpass filter (B.P.F.) bank 93. It is subjected to frequency analysis at each periodic sampling of this 14-channel B.P.F. bank and then subjected to binary conversion calculation at the binary conversion calculation unit 94, whereby there can be obtained a binary converted data as shown in FIG. 21. In the present example, since use is made of a 14-channel bandpass filter, there are two empty channels E as shown in the drawing. This binary converted data is used for dictionary formation and for various functions at the recognition unit with one word length.

Figure 22:
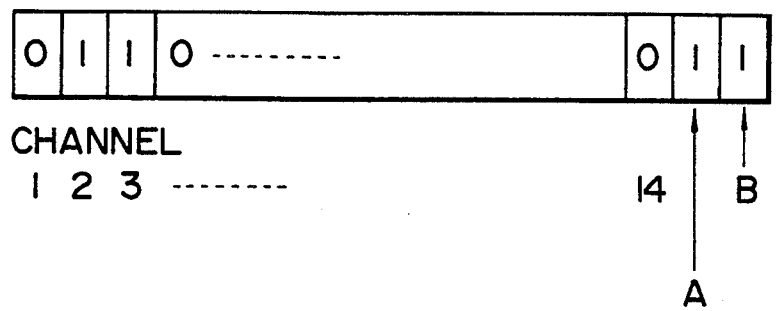
FIG. 22 is an illustration showing an example of using an empty bit.
Figure 23:
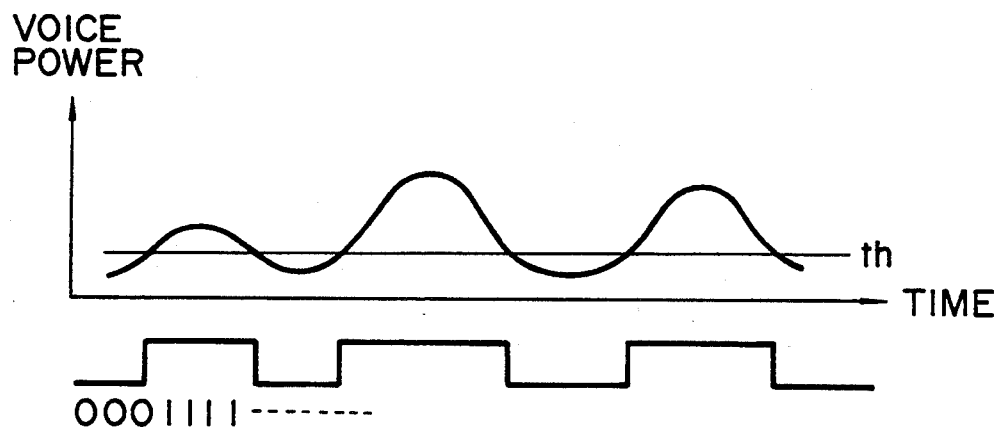
FIG. 23 is an illustration showing a method for determining a voice interval.
Figure 24:
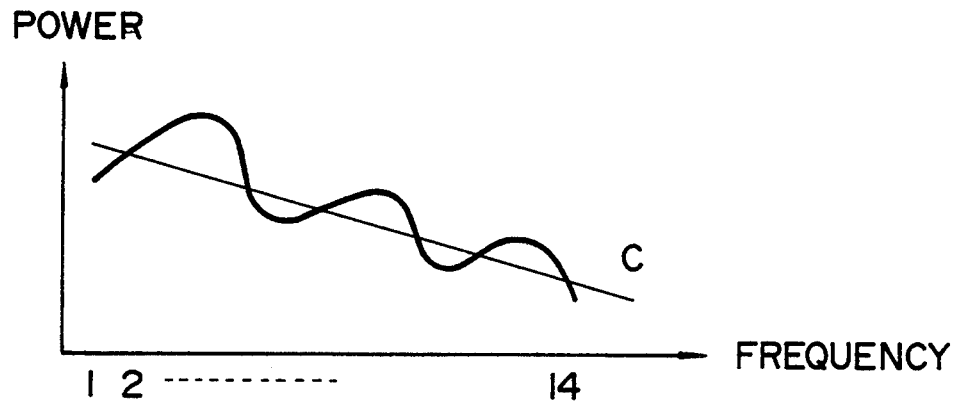
FIG. 24 is an illustration showing a method of sampling a BTSP data.

FIG. 19 shows an apparatus suitable for practicing a pattern matching method according to the present invention. In the drawing, 100 is a voice interval detecting unit; 101 is a voice presence/voice absence detecting unit; 102 is an interval bit control unit; and 103 is a voice presence bit control unit. And, those portions which have similar functions as those of the prior art shown in FIG. 20 are designated by the same reference numerals as those in FIG. 20. Hereinafter, as an example of the present invention, a description will be had with respect to an example in which use is made of a voice interval detection signal and voice presence and voice absence detection for the control bit. A voice input through the microphone passes, similarly as described before, the pre-processing unit and the 14-channel bandpass filter, and a binary converted data is created at the binary conversion unit in a manner similarly as described before. In this case, as shown in FIG. 22, a voice interval signal A and a voice presence/voice absence signal B are placed in the empty channels E of FIG. 21. Here, a voice interval signal is obtained by checking a voice power signal by a certain threshold value as shown in FIG. 23. In addition, as shown in FIG. 24, a voice presence/voice absence signal is obtained such that, while defining voice presence by a negative slope of a least square approximation curve C of a voice formant at the time of sampling and voice absence by a positive slope thereof, the bit of a binary converted data is set at 1 for voice presence and at 0 for voice absence. In this manner, there are obtained a binary converted data of 14-channel frequency components and a binary converted (BTSP) data containing the voice interval signal and the voice presence and voice absence information.

In the thus obtained binary converted information, the binary converted information from the frequency information of channels 1–14 is information for obtaining the degree of similarity at the time of essential recognition, whereas the voice interval bit and the voice presence and voice absence bit are control bits at the time of recognition. Dictionary formation is carried out by using the binary converted information thus obtained for one word. In this case, since the control bits are two-value bits similarly with the other information, they are weight-averaged as they are. With the control bits contained in the BTSP data as a binary bit of 0 and 1 as described above, they can be treated similarly with the frequency information of 0 and 1 at the time of formation of a dictionary, which is extremely simple.

Figure 25:
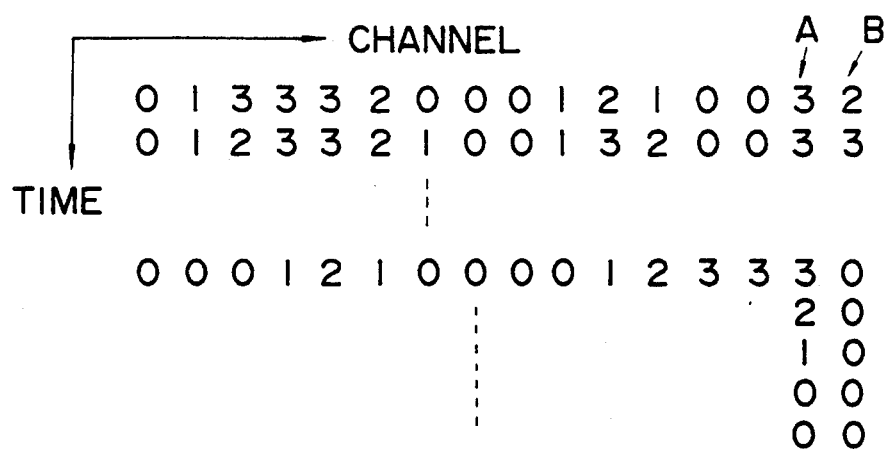
FIG. 25 is an illustration showing one example of a weighted average.

Next, a description will be had with respect to a manner of using the control bits at the time of recognition. As described above, regarding the control bits in a dictionary, since the information of each pronunciation is subjected to weight averaging, for example, in the case of three pronunciations, each bit takes a value between 0 and 3 as shown in FIG. 25, which contains a fluctuating component, and thus, in accordance with a control rule predetermined for the control bit at the same position of an unknown, input pattern, pattern matching at the time of recognition is carried out. For example, in the case of a voice presence/voice absence bit, if the voice presence/voice absence bit of the unknown, input pattern is 1, the degree of similarity of its frame is set at 0 only when its bit is 0 with three times of pronunciations of a dictionary or the input is 0 and that of the dictionary is 3. Other than that, an accurate degree of similarity can be obtained by calculating the degree of similarity normally.

Figure 26:
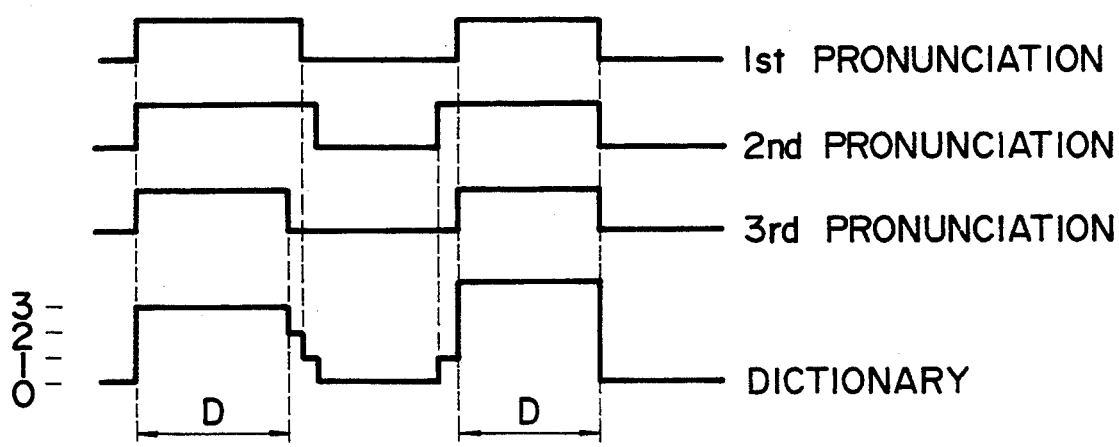
FIG. 26 is an illustration showing an example of a recognition calculation.

In the case of the voice interval signal, for example, simply by arranging not to calculate the degree of similarity only for a portion of 3 or less such as a word end portion of a voice presence block unit, it is possible to carry out a recognition calculation with the generally spoken unstability of a word end portion eliminated. FIG. 26 is a drawing showing this, in which D is a recognition object block range, and a dictionary is formed by subjecting each pronunciation to linear expansion and contraction, whereby a portion of 3 or less, i.e., unstable portion, is not made an object of recognition. In this manner, with the allotment of control bits useful for recognition, there can be constructed a pattern control system which absorbs its fluctuating component. Of course, the kind of a control bit is not limited.

In this manner, by using a pair of 16-bit data having the power of 2 as a unit, the processing speed can be increased, and by allocating a control bit to its empty channel, the calculation control of the frequency data of BTSP can be carried out easily and the absorption of fluctuating components, which is an inherent feature of BTSP, can be contained within the control bit, thereby allowing to carry out recognition easily at high accuracy.

INDUSTRIAL APPLICABILITY

As described in detail above, an apparatus and method of the present invention can be applied to voice recognition.

What is claimed is:

1. A voice pattern similarity calculating apparatus for calculating a degree of similarity through comparing an input voice pattern and a registered voice pattern, the apparatus comprising:
   a) voice pattern generating means for generating a digital voice pattern having a predetermined number of elements by dividing an input voice signal into the same predetermined number of frequency bands and forming a digitized output signal for each of the bands;
   b) a library for storing registered voice patterns which include sub-patterns which have been previously formed by a method including the steps of:
      1) forming a plurality of voice patterns by repetitively pronouncing the same sound,
      2) superimposing the plurality of voice patterns to form a superimposed pattern,
      3) digitizing the value of each element of the superimposed pattern to form digitized superimposed pattern values, and
      4) forming plural sub-patterns from the digitized superimposed pattern values, the sub-patterns having a plurality of elements, the plural sub-patterns being for forming binary numbers by combining respective elements of the plurality of elements of the sub-patterns;
   c) comparison means for comparing:
      (1) the predetermined plurality of elements in the digitized voice pattern from the voice pattern generating means, with
      (2) the predetermined plurality of elements of the sub-patterns; and
   d) similarity calculating means for calculating the degree of similarity from a result of comparing from the comparison means.

2. The apparatus of claim 1, wherein weighting is effected to the compared result in accordance with bit location when the degree of similarity is calculated by the similarity calculating means.

3. The apparatus of claim 1, further comprising:
   designating means for designating a second plurality of patterns among the sub-patterns to be preliminarily matched with the digitized voice pattern; and
   preliminary selecting means for selecting from the library a registered voice pattern to be compared as a result of preliminary comparison with a sub-pattern designated by the designating means.

4. The apparatus of claim 3, wherein the pattern to be subjected to preliminary comparison is a pattern formed by a logical sum if the second plurality is equal to or larger than 2.

5. The apparatus of claim 4, wherein weighting is effected to the compared result in accordance with bit location when the degree of similarity is calculated by the similarity calculating means.

6. The apparatus of claim 3, wherein weighting is effected to the compared result in accordance with bit location when the degree of similarity is calculated by the similarity calculating means.

7. A voice pattern similarity calculating apparatus for calculating a degree of similarity through comparing an input voice pattern and a registered voice pattern, the apparatus comprising:

a) voice pattern generating means for generating a digital voice pattern having a predetermined number of elements by dividing an input voice signal into the same predetermined number of frequency bands and forming a digitized output signal for each of the bands;

b) a library for storing registered voice patterns that include sub-frames which have been previously formed by a method including the steps of:

1) creating a plurality of voice patterns including n frames obtained by pronouncing the same word a number of times;

2) adding the plurality of voice patterns by superimposition, to thereby define a superimposed pattern;

3) assigning a significance-related position for each of the elements in a frame which defines the superimposed pattern; and 4) collecting elements having the same significance-related position for each frame, to thereby divide the frame into a plurality of sub-frames;

c) comparison means for comparing each element of a digitized voice pattern generated by the voice pattern generating means with each element of a voice pattern registered in the library, wherein for each frame of the digitized voice pattern the frame is made to correspond to a sub-frame in the library; and d) similarity calculating means for calculating the degree of similarity from a result of comparing from the comparison means.

8. The apparatus of claim 7, wherein:

weighting is effected to the compared result in accordance with the sub-frame when the degree of similarity is calculated by the similarity calculating means.

9. The apparatus of claim 7, further comprising:

designating means for designating one or more sub-frames from each frame to be preliminarily matched with the digitized voice pattern; and preliminary selecting means for selecting from the library a registered voice pattern to be compared as a result of preliminary comparison with the one or more sub-frames designated by the designating means.

10. The apparatus of claim 9, wherein:

the pattern to be subjected to preliminary comparison is a frame formed by a logical sum.

11. The apparatus of claim 10, wherein:

weighting is effected to the compared result in accordance with the sub-frame when the degree of similarity is calculated by the similarity calculating means.

12. The apparatus of claim 9, wherein:

weighting is effected to the compared result in accordance with the sub-frame when the degree of similarity is calculated by the similarity calculating means.

\* \* \* \* \*